(12) United States Patent
Biegert et al.

(10) Patent No.: US 9,530,068 B2
(45) Date of Patent: Dec. 27, 2016

(54) TEMPLATE MATCHING WITH DATA CORRECTION

(71) Applicant: International Business Machines Corporation, Armonk, NY (US)

(72) Inventors: Keith P. Biegert, Cary, NC (US); Brendan C. Bull, Durham, NC (US); David Contreras, Apex, NC (US); Robert C. Sizemore, Fuquay-Varina, NC (US); Sterling R. Smith, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/537,113

(22) Filed: Nov. 10, 2014

(65) Prior Publication Data

US 2016/0132738 A1    May 12, 2016

(51) Int. Cl.
| | |
|---|---|
| *G06K 9/18* | (2006.01) |
| *G06K 9/62* | (2006.01) |
| *G06K 9/52* | (2006.01) |
| *G06K 9/00* | (2006.01) |

(52) U.S. Cl.
CPC ............ *G06K 9/18* (2013.01); *G06K 9/00449* (2013.01); *G06K 9/52* (2013.01); *G06K 9/6201* (2013.01)

(58) Field of Classification Search
None
See application file for complete search history.

(56) References Cited

U.S. PATENT DOCUMENTS

| | | | |
|---|---|---|---|
| 3,969,700 A * | 7/1976 | Bollinger | G10L 15/00 382/177 |
| 8,335,007 B2 | 12/2012 | Sensu | |
| 8,675,220 B2 | 3/2014 | Meyers et al. | |
| 2010/0040286 A1* | 2/2010 | Matsuzawa | G06F 17/248 382/173 |
| 2013/0250339 A1 | 9/2013 | Ming | |

* cited by examiner

*Primary Examiner* — Mark Roz
(74) *Attorney, Agent, or Firm* — Van Leeuwen & Van Leeuwen; Diana R. Gerhardt

(57) ABSTRACT

An approach is provided to generate forms with template inclusions. In the approach, optical character recognition (OCR) text is compared to corresponding text in a selected form. Characters of text in the OCR text are then replaced with text from the template text, the replacing results in a form with template inclusions. The form with template inclusions is then processed by a forms processing operation.

17 Claims, 7 Drawing Sheets

TEMPLATE MATCHING WITH DATA CORRECTION

BACKGROUND

Interoffice communications often utilizes facsimiles either in the form of a traditional fax transmitted by a fax machine or by scanning in a document and transmitting the scanned document, such as in an email attachment. Facsimiles are often used with preprinted forms. Using preprinted forms, the sender usually obtains a blank preprinted form (hardcopy) and fills in the fields by hand. After filling in the preprinted forms, the sender, such as a health care professional, transmits a facsimile for processing. Unfortunately, the forms are often received with poor quality. Poor quality can result from many factors, such as poor quality equipment (faxes, scanners, etc.) and poor quality forms that might be crumpled or have erroneous markings making the form difficult to read. When these poor quality transmissions are processed by optical character recognition (OCR), the OCR generates text that includes many errors. The errors generated by the OCR cause various problems in processing the completed document. In an insurance setting, the errors may effect the ability to match the appropriate portion of the insurance policy to the completed form. Differences between the insurance policy and the OCR generated text may result in an assessment that a policy provision is "Not Met" instead of "Met". In some cases, the OCR errors can result in values of "Missing" instead of "Met." In addition, the OCR errors can cause errors in a Question/Answering (QA) System. In particular, the errors might cause the parsing of the sentences to be incorrect and failure to recognize parts of speech. In a medical environment, the errors might causes medical concepts to be annotated incorrectly.

BRIEF SUMMARY

According to one embodiment of the present disclosure, an approach is provided to generate forms with template inclusions. In the approach, optical character recognition (OCR) text is compared to corresponding text in a selected form. Characters of text in the OCR text are then replaced with text from the template text, the replacing results in a form with template inclusions. The form with template inclusions is then processed by a forms processing operation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
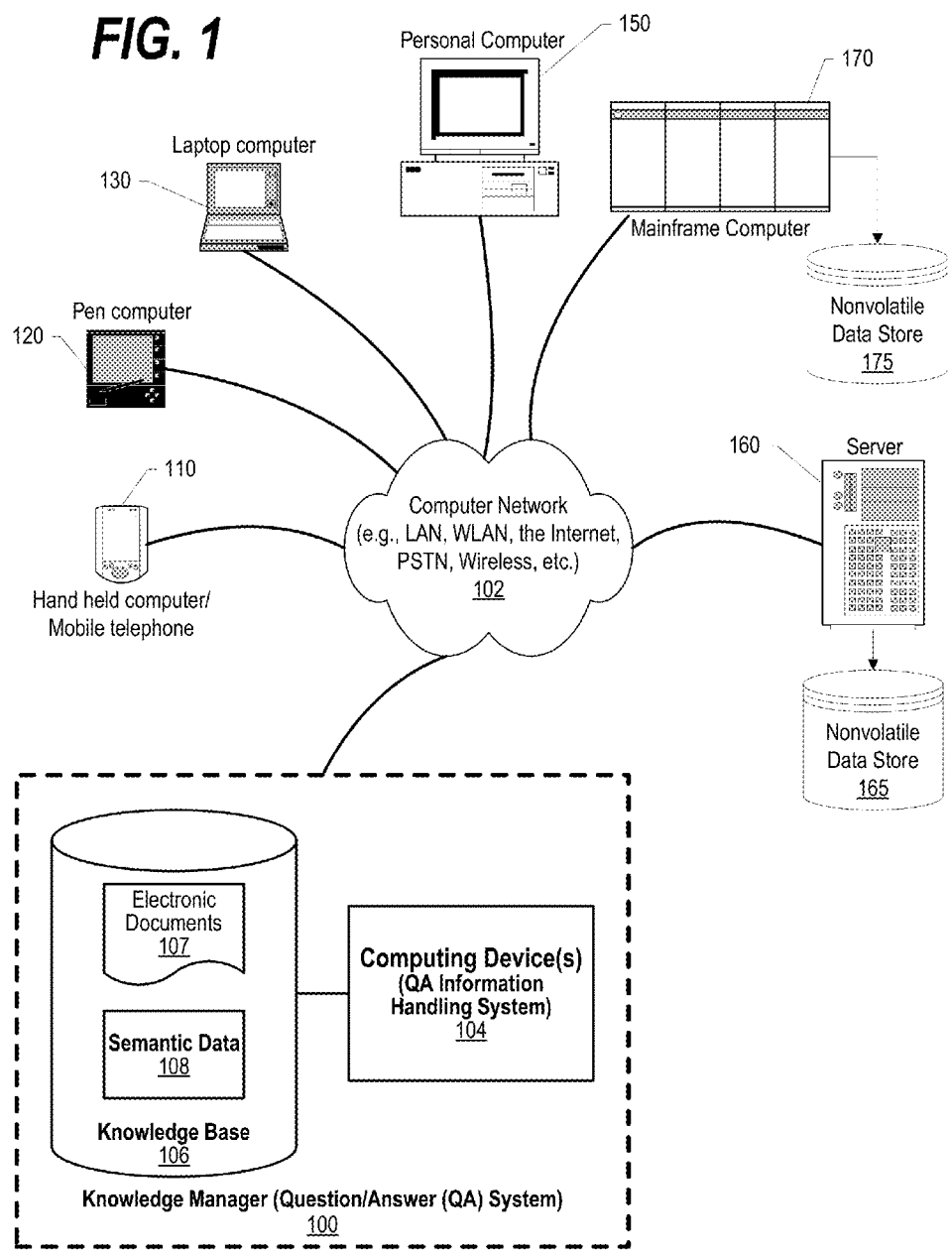
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
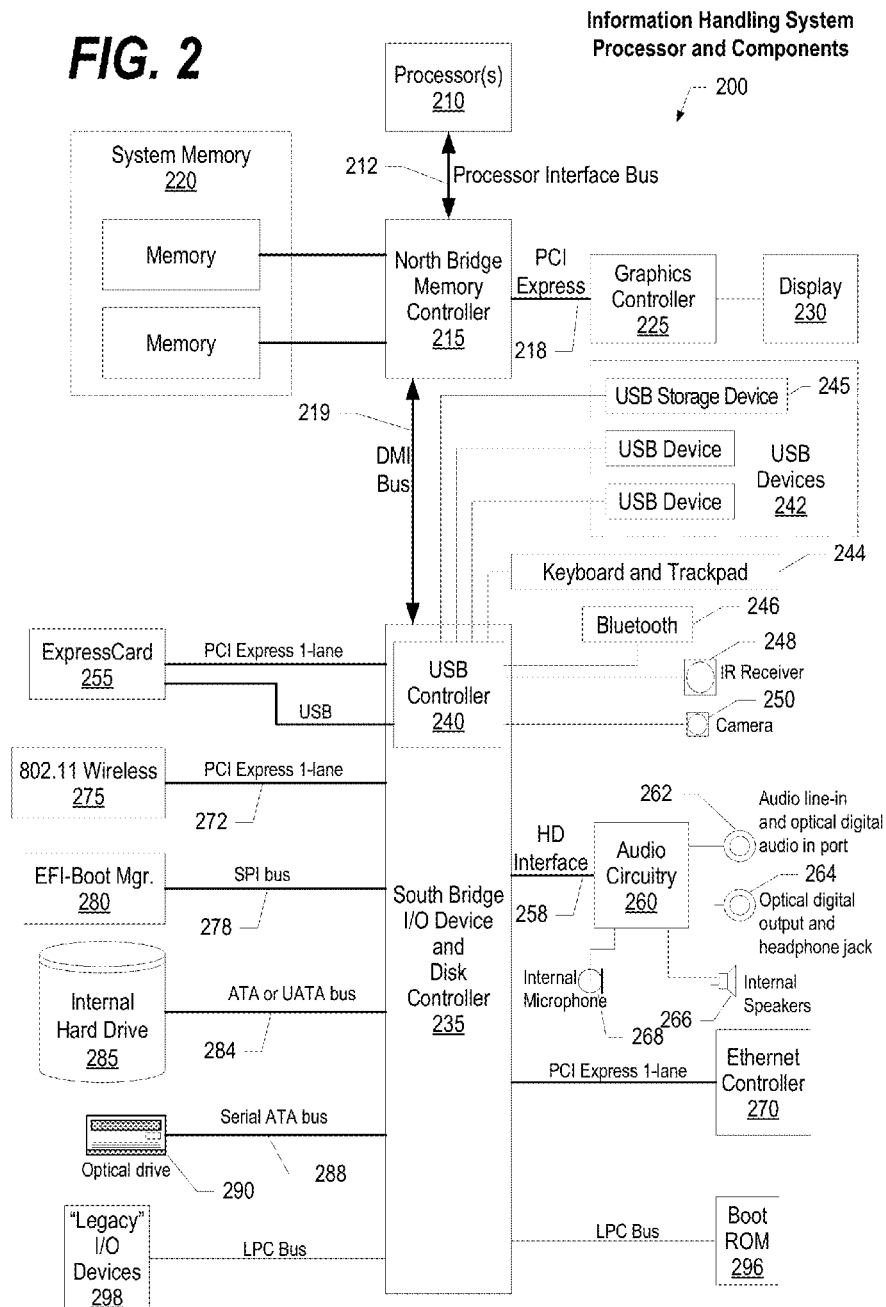
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-7 describe an approach that uses a fuzzy matching algorithm to match optical character recognition (OCR) text generated from an incoming facsimile to a form template (e.g., a blank form, etc.), identify which version of the form template matches the OCR text, and corrects possible errors in the OCR text by replacing characters in the OCR text with characters found in the form template file.

By way of an example, suppose that a blank heart assessment form has been selected by a health care provider (nurse, doctor, etc.) and filled in by hand when evaluating a patient. Once completed, the hand-filled form is sent to a service that generates OCR text using an electronic scanner and traditional OCR software that generates characters from the scanned document. Because the hand-filled form may be crumpled, have smudges or other erroneous markings, and the like, the OCR text may contain errors. Some of these errors pertain to the form template text. For example, a form template question regarding performance of a particular test for heart disease may be scanned incorrectly so that the test in the OCR text does not match available tests covered by the patient's health insurance.

The system uses a fuzzy matching algorithm to identify that the OCR text most closely matches the provider's "Heart Health Assessment" form. Because the provider might change forms over time, the system next identifies which version of the "Heart Health Assessment" form matches the OCR text. In other words, the system identifies the particular version of the form template that was filled in by the form user, which in this case is a health care professional. Once the correct form and version are identified, the system compares the OCR text with the form template text using a fuzzy matching algorithm. Text found only in the OCR text (e.g., markings, notes, etc. originally handwritten by the health care professional, etc.) are taken from the OCR text. Text found in both the OCR text and in the form template text might be somewhat different due to errors introduced during the OCR text generation process. Text found in both the OCR text and in the form template text is taken from the form template text to eliminate any errors that may have been introduced to the text during the OCR text generation process.

Figure 3:
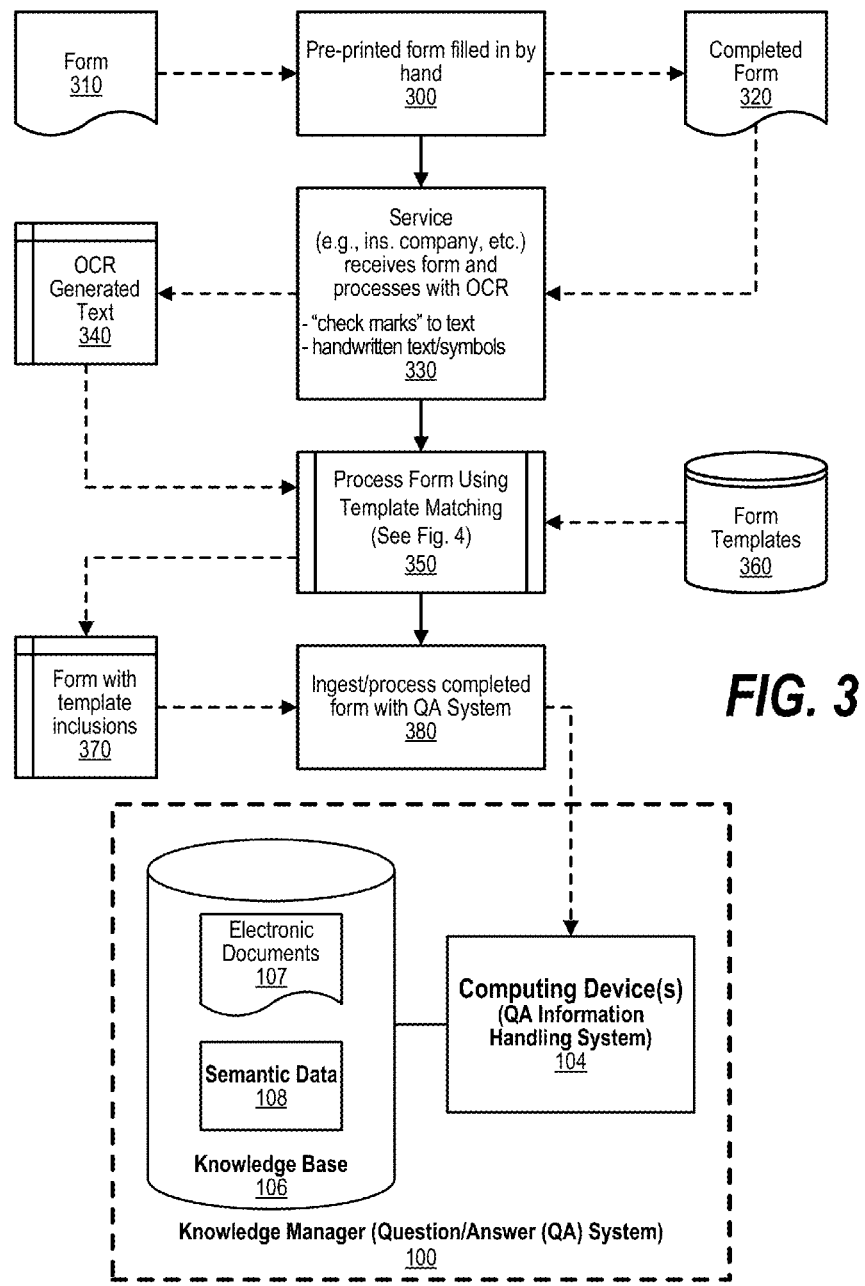
FIG. 3 is a high level flowchart showing the overall process of preprinted forms being completed and eventually ingested by the QA system.

FIG. 3 is a high level flowchart showing the overall process of preprinted forms being completed and eventually ingested by the QA system. At step 300, a person, such as a medical professional, fills in preprinted form 310 by hand. The result of step 300 is completed form 320. For example, preprinted form 310 may be a medical diagnostic form that a medical professional completes by hand, resulting in completed form 320 which is a combination of preprinted (typed) text and handwritten text provided by the user.

At step 330, a service provider (e.g., an insurance company, etc.) receives completed form 320 form and processes the form using optical character recognition (OCR) technology which converts the images (typewritten text, handwritten text, etc.) appearing on the form into OCR text. In addition, step 330 further converts handwritten "checkmarks" and other handwritten or typed symbols appearing on the form into a textual representation (e.g., an "X" for a checkmark, etc.). Step 330 stores the OCR text in memory area 340.

Figure 4:
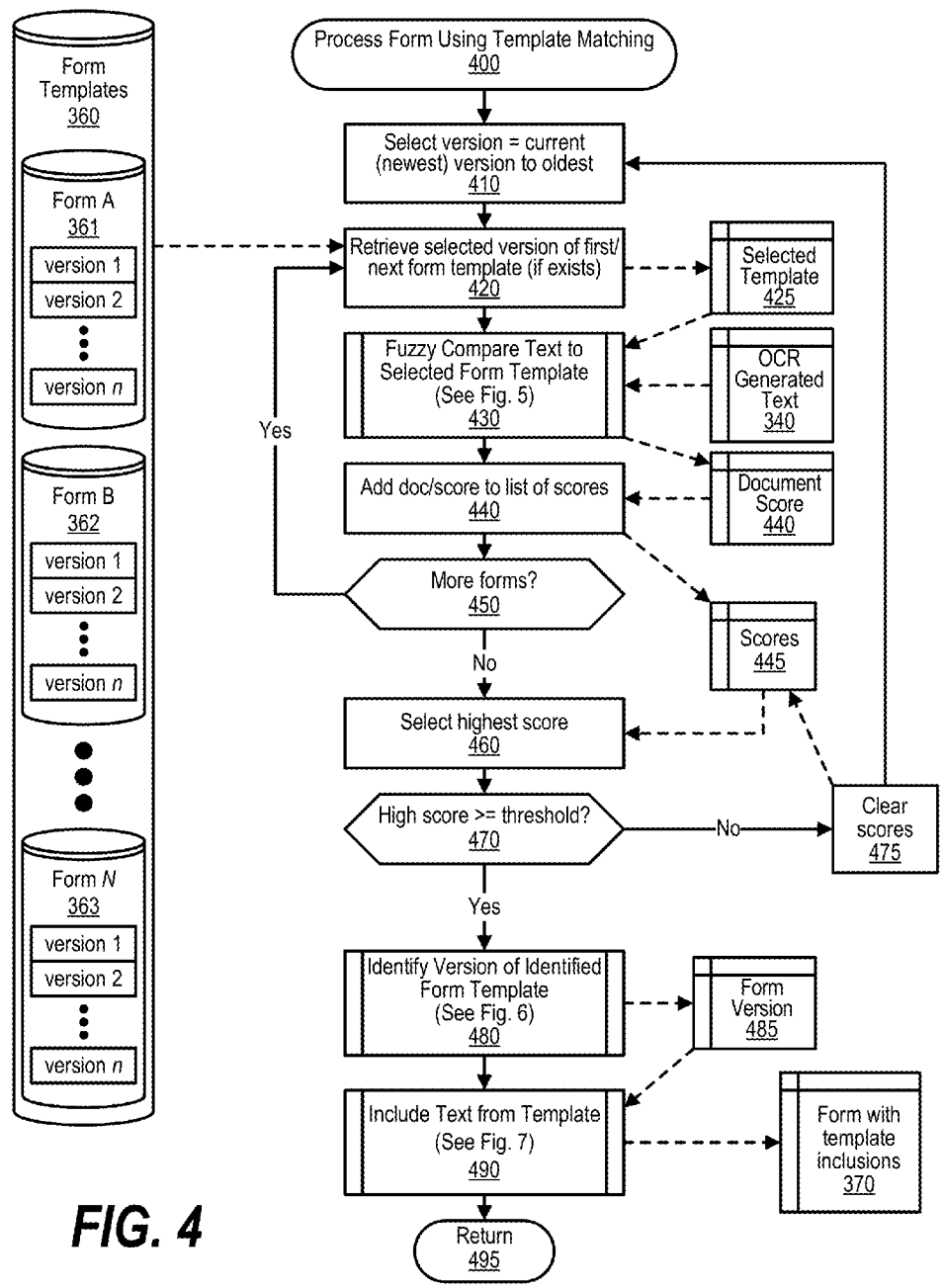
FIG. 4 is a flowchart showing the steps taken to process the form using template matching.

At predefined process 350, the process performs the Process Form Using Template Matching routine (see FIG. 4 and corresponding text for processing details). Predefined process 350 receives OCR text from memory area 340 and form templates from data store 360 as inputs. The result of predefined process 350 is a form with template inclusions that is stored in memory area 370. At step 380, the process receives the form with template inclusions from memory area 370 and ingests and otherwise processes the completed form into QA System 100.

FIG. 4 is a flowchart showing the steps taken to process the form using template matching. FIG. 4 commences at 400 and shows the steps taken by a process that performs the routine that processes a form using template matching. At step 410, the process selects a first version of the form templates stored in data store 360 by starting at the most current version of the forms. At step 420, the process retrieves the selected version (most current, next most current, etc.) of the first form template from data store 360. Step 420 stores the selected version of the form template in memory area 425. Various form templates are shown being stored in data store 360 with each of the form templates having one or more versions. For example, Form "A" (361) is shown with version 1, version 2 through version n. Likewise, Form "B" (362) is also shown with version 1, version 2 through version n. Any number of forms can be stored in data store 360 with the last form being shown as Form "N" (363) with this last form also having versions 1, 2, though version n.

Figure 5:
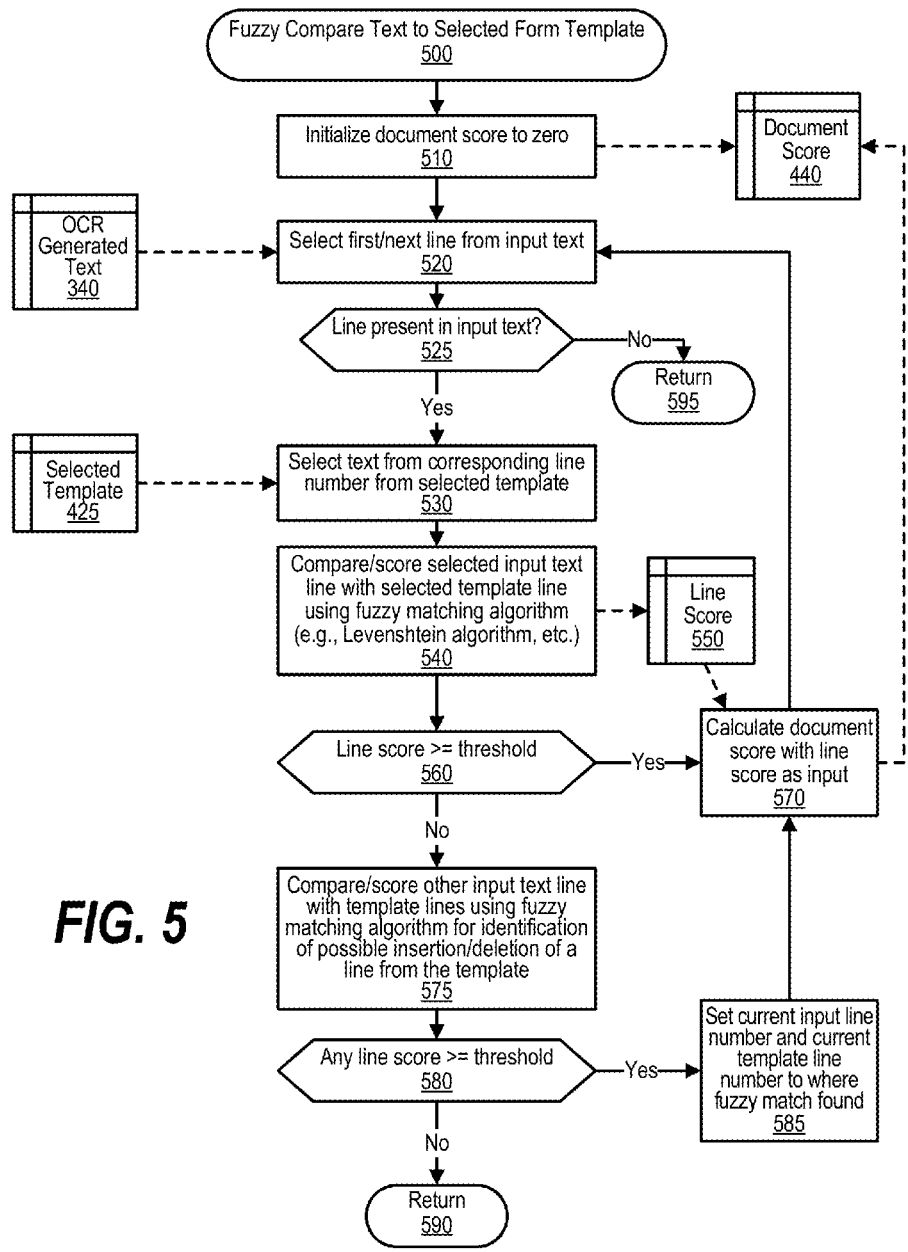
FIG. 5 is a flowchart showing the steps taken to perform a fuzzy compare of form-based text with text from a form template.

At predefined process 430, the process performs the Fuzzy Compare Text to Selected Form Template routine (see FIG. 5 and corresponding text for processing details). Predefined process 430 receives the selected template from memory area 425 as an input along with the optical character recognition (OCR) generated text as an input from memory area 340. The output of predefined process 430 is a form comparison score that is stored in memory area 440. At step 440, the process adds the most recent form comparison score from memory area 440 to a list of form comparison scores with the list of scores being stored in memory area 445. The process determines as to whether there are more form templates that need to be processed (decision 450). If there are more form templates to process, then decision 450 branches to the 'yes' branch which loops back to step 420 to select and process the next form template from data store 360. This looping continues until there are no more form templates of the selected version (e.g., the "newest" versions of all templates have been processed, etc.) to compare to the OCR generated text, at which point decision 450 branches to the 'no' branch for further processing.

At step 460, the process selects the highest form comparison score from the list of form comparison scores stored in memory area 445. The process determines as to whether the highest score is above a threshold indicating that the form used to generate the OCR text is the same form as the selected form template (decision 470). If the highest form comparison score does not meet the threshold, then decision 470 branches to the 'no' branch whereupon, at step 475, the list of form comparison scores is cleared from memory area 445 and processing loops back to step 410 to select a different (older) version of the forms with the older version then being used to compare against the OCR text. This looping continues until a version of a form is found with the highest form comparison score being above the threshold indicating that the correct form template has been identified, with decision 470 branching to the 'yes' branch for further processing.

Figure 6:
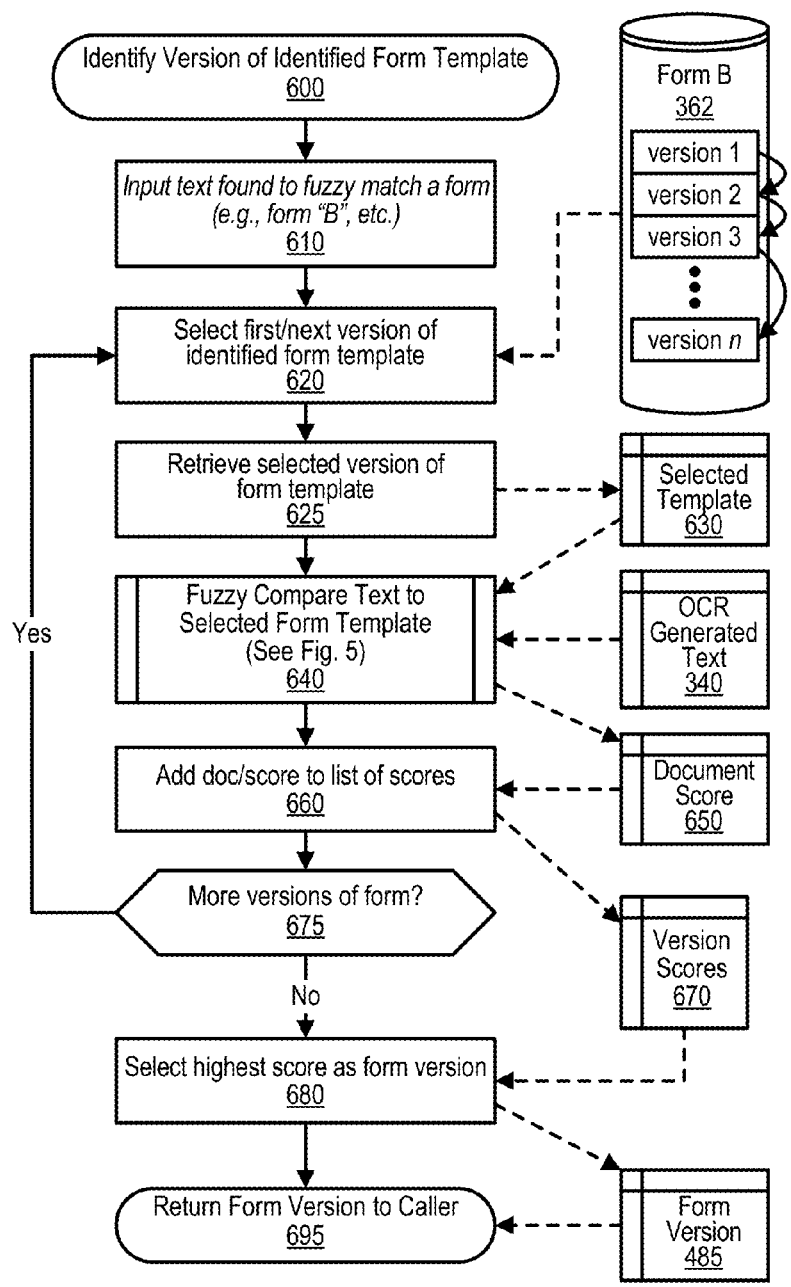
FIG. 6 is a flowchart showing the steps taken to identify a version of a particular form received from a sender.

At predefined process 480, the process performs the Identify Version of Identified Form Template routine (see FIG. 6 and corresponding text for processing details). Once the OCR text has been successfully matched with a form template, predefined process 480 is used to identify the specific version of the form template that bests matches the OCR text. The identified form version is stored in memory area 485. At predefined process 490, the process performs the Include Text from Template routine (see FIG. 7 and corresponding text for processing details). Predefined process 490 uses the identified form template that bests matches the OCR text as an input from memory area 485 and processes the OCR text in conjunction with the form template version to generate a form with template inclusions that is stored in memory area 370. FIG. 4 processing thereafter returns to the calling routine (see FIG. 3) at 495.

FIG. 5 is a flowchart showing the steps taken to perform a fuzzy compare of form-based text with text from a form template. FIG. 5 commences at 500 and shows the steps taken by a process that performs a fuzzy comparison of OCR text to a selected form template. At step 510, the process initializes the document score to zero. As the routine shown in FIG. 5 is used to both identify the form template (called from FIG. 4) as well as identify the version of the form template that was used (called from FIG. 6), the document score may either be the form comparison score (when called from FIG. 4) or the form version score (when called from FIG. 6).

At step 520, the process selects the first line of OCR generated text input from memory area 340. As lines are repeatedly selected from the OCR text, the process determines whether the selected line is present in the OCR generated text or if an end-of-file condition has occurred (decision 525). If the selected line is present in the OCR text, then decision 525 branches to the 'yes' branch to process the line. The processing continues until there are no more lines of text in the OCR generated text (end-of-file condition), at which point decision 525 branches to the 'no' branch and processing returns to the calling routine (either FIG. 4 or FIG. 6) at 595.

At step 530, the process selects the text from the corresponding line number from the selected template that is being compared to the OCR text. At step 540, the process compares the selected OCR input text line with the selected template line using a fuzzy matching algorithm (e.g., Levenshtein algorithm, etc.). The comparison, using the fuzzy matching algorithm, results in a line score that is stored in memory area 550. The process determines as to whether the resulting line score is above a threshold indicating that the OCR text has similar characters as the text from the selected form template (decision 560). In one embodiment, similarity between lines is weighted to compare the beginnings of the lines where preprinted form text is usually found, with text occurring towards the end of the line (e.g., text input from the form user, etc.) being weighted less heavily.

If the line score is above the threshold value, then decision 560 branches to the 'yes' branch whereupon, at step 570, the current document score is updated (calculated) using the line score from memory area 550 as an additional input. The current overall document score is stored in memory area 440. On the other hand, if the line score does not meet or exceed the threshold value, then decision 560 branches to the 'no' branch for further processing.

At step 575, the process compares other input text lines from the OCR text with other template lines using fuzzy matching algorithm to identify possible insertions or deletions of one or more lines from the form template. For example, the form corresponding to the OCR text may not line up with the selected form template because the form has been updated to add an additional line to the template. In this case, such additional lines are skipped so that a comparison can be made between OCR text lines and the corresponding lines from the form template. The process determines as to whether any line score exceed the threshold value (decision 580). If any line score exceeds the threshold value, indicating a possible insertion or deletion of a line from the form template, then decision 580 branches to the 'yes' branch whereupon, at step 585, the process sets the current input line number from the OCR text and the current template line number to the respective lines where the fuzzy match was found. Processing then loops back to step 570 to calculate the current document score and then loops further back to step 520 to select the next line from the OCR text input.

Returning to decision 580, if none of the line scores generated a line score that met or exceeded the threshold (indicating dissimilar documents), then decision 580 branches to the 'no' branch and processing returns to the calling routine (either FIG. 4 or FIG. 6) at 590.

FIG. 6 is a flowchart showing the steps taken to identify a version of a particular form received from a sender. FIG. 6 commences at 600 and shows the steps taken by a process that performs the routine that identifies the version of an identified form template used to generate the OCR text. At step 610, the process receives, as an input, the form template that was found to have a fuzzy match with the OCR text. In the example shown, Form "B" (362) was found to be the form that corresponded to the OCR text. In a health care environment, Form "B" might be the "Heart Health Assessment" form referred to in an earlier example. The processing performed by FIG. 6 will identify the specific version of Form "B" that corresponds to the OCR input text.

At step 620, the process selects the first form template version of the identified form template. For example, Form "B" is shown having versions 1, 2, 3 through version "n". In one embodiment, the first version that is selected is the current (newest) version of the form template with subsequently selected versions being older (previous) versions of the form template. At step 625, the process retrieves the selected version of form template from the forms data store (e.g., data store 362, etc.) and the selected version of the form template is stored in memory area 630.

At predefined process 640, the process performs the Fuzzy Compare Text to Selected Form Template routine (see FIG. 5 and corresponding text for processing details). Predefined process 640 receives the selected template from memory area 630 as an input along with the OCR text from memory area 340. The result of predefined process 640 is a form version score that is stored in memory area 650. At step 660, the process adds the form version score from memory area 650 to a list of form version scores that is stored in memory area 670.

The process determines as to whether there are more versions of the form template to process (decision 675). If there are more versions of the form template, then decision 675 branches to the 'yes' branch which loops back to step 620 to select and process the next version of the form template as described above. This looping continues until there are no more versions of the form template to process, at which point decision 675 branches to the 'no' branch. At step 680, the process selects the highest form version score from the list of form version scores as the form template version that corresponds to the OCR text input. The identified form template version is stored in memory area 485. Processing then returns the identified form template version back to the caller (see FIG. 4) at 695.

Figure 7:
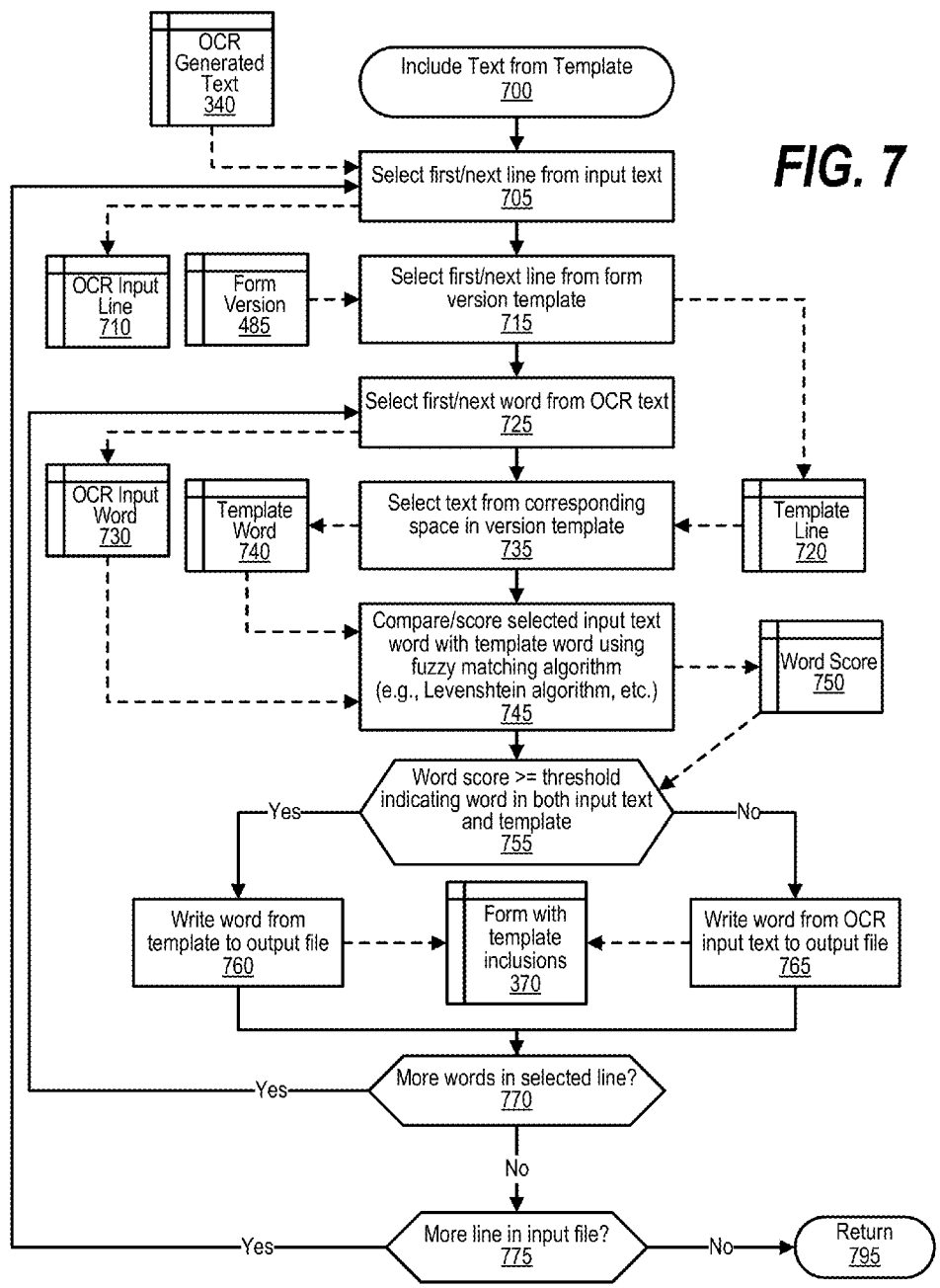
FIG. 7 is a flowchart showing the steps taken to include text identified in a template as text in the completed form.

FIG. 7 is a flowchart showing the steps taken to include text identified in a template as text in the completed form. FIG. 7 processing commences at 700 and shows the steps taken by a process that performs a routine to include text from the form template to create a form based on the OCR text with template inclusions. At step 705, the process selects the first line from the OCR text that is retrieved from memory area 340. The selected OCR line is stored in memory area 710.

At step 715, the process selects the first line from the identified form version template with the identified form version template having previously been stored in memory area 485. At step 725, the process selects the first word from the OCR text input line stored in memory area 710. The selected OCR word is stored in memory area 730. At step 735, the process selects the text from the corresponding space in the version template line that is retrieved from memory area 720. Because the form template may include blank lines and areas that are filled in by the user of the form, a "space" is selected from the form template which may or may not contain a word of text. The text from the corresponding space in the form template is stored in memory area 740.

At step 745, the process compares the selected input text word from the OCR text with the selected form template word using a fuzzy matching algorithm (e.g., Levenshtein algorithm, etc.). The result of step 745 is a word comparison score that is stored in memory area 750.

The process determines as to whether the word comparison score meets or exceeds a threshold value that indicates that a word was found in the OCR text and a somewhat similar, or identical word, was found in the form template (decision 755). If the comparison indicates that a word is in both the OCR input text and the form template, then decision 755 branches to the 'yes' branch whereupon, at step 760, the word from the form template is written to the form with template inclusions file that is stored in memory area 370. For example, during OCR text generation, the word "heat" may have been generated rather than the word "heart" that was actually printed on the form. In this example, the process would compare the word "heat" from in the OCR text and the word "heart" from the form template text and write the word "heart" to the output file rather than writing the (incorrect) word "heat" from the OCR text. On the other hand, if the word comparison score indicates that the word is absent from the form template (e.g., a word written on the form by the person that filled out the form, etc.), then decision 755 branches to the 'no' branch whereupon, at step 765, the word from the OCR text is written to the form with template inclusions file that is stored in memory area 370.

The process determines as to whether there are more words in the selected line of OCR text to process (decision 770). If there are more words in the selected line to process, then decision 770 branches to the 'yes' branch which loops back to step 725 to select the next word from the selected line and process the selected word as described above. On the other hand, if there are no more words on the selected line to process, then decision 770 branches to the 'no' branch.

The process next determines as to whether there are more lines in the OCR text that need to be processed (decision 775). If there are more lines of OCR text to process, then decision 775 branches to the 'yes' branch which loops back to step 705 to select and process the next word from the OCR text and the next line from the form template. This looping continues until there are no more lines in the OCR text to process, at which point decision 775 branches to the 'no' branch and processing returns to the calling routine (see FIG. 4) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    receiving a selected form comprising printed text and handwritten text;
    identifying a selected form template from a plurality of form templates, wherein each of the plurality of form templates comprises a plurality of lines of text, and wherein the identifying further comprises:
        performing a fuzzy comparison of a first optical character recognition (OCR) text corresponding to the selected form printed text, and excluding the handwritten text, with text from the plurality of form templates, wherein each of the comparisons results in a form comparison score; and
        selecting the selected form template from the plurality of form templates based on the corresponding form comparison score;
    in response to identifying the selected form template, comparing the first OCR text corresponding to the selected form with template text corresponding to the selected form template;
    replacing a plurality of characters in the first OCR text with text from the template text, the replacing resulting in a form with template inclusions; and
    processing the form with template inclusions in a forms processing operation.

2. The method of claim 1 wherein the comparing further comprises:
    comparing each word of the template text with a corresponding word from the first OCR text using a fuzzy matching algorithm, wherein the replacing of the plurality of characters is performed in response to the comparing.

3. The method of claim 2 further comprising:
    selecting each word of text from a second OCR text corresponding to the selected form printed text and including the handwritten text;
    identifying a corresponding word in the template text that corresponds to each of the selected words from the second OCR text;
    comparing the selected word from the second OCR text with the corresponding word in the template text using the fuzzy matching algorithm, wherein the comparing results in a word comparison score;
    writing the selected word from the second OCR text to the form with template inclusions in response to the word comparison score indicating that the selected word is absent from the template text; and
    writing the corresponding word from the template text to the form with template inclusions in response to the word comparison score indicating that the selected word is present in the template text.

4. The method of claim 1 further comprising:
    identifying a version of the selected form template from a plurality of versions of the selected form template, wherein the identifying further comprises:
        performing a fuzzy comparison of the first OCR text with the text from the plurality of versions of the selected form template, wherein each of the comparisons results in a form version score; and
        selecting the selected form template from the plurality of versions of the selected form template based on the corresponding form version score.

5. The method of claim 1 further comprising:
    ingesting the form with template inclusions into a Question Answering (QA) System corpus.

6. The method of claim 1 further comprising:
    wherein the selected document is a facsimile of the selected form template that has been filled in by hand; and
    performing an OCR process on the selected document, wherein the OCR process results in the first OCR text.

7. An information handling system comprising:
    one or more processors;
    a memory coupled to at least one of the processors; and
    a set of computer program instructions stored in the memory and executed by at least one of the processors in order to perform actions of:
    receiving a selected form comprising printed text and handwritten text;
    identifying a selected form template from a plurality of form templates, wherein each of the plurality of form templates comprises a plurality of lines of text, and wherein the actions that perform the identifying further comprise:
        performing a fuzzy comparison of a first optical character recognition (OCR) text corresponding to the selected form printed text, and excluding the handwritten text, with text from the plurality of form templates, wherein each of the comparisons results in a form comparison score; and
        selecting the selected form template from the plurality of form templates based on the corresponding form comparison score;
    comparing the first OCR text corresponding to the selected form with template text corresponding to the selected form template;

replacing a plurality of characters in the first OCR text with text from the template text, the replacing resulting in a form with template inclusions; and processing the form with template inclusions in a forms processing operation.

8. The information handling system of claim 7 wherein the actions that perform the comparing further comprise:

comparing each word of the template text with a corresponding word from the first OCR text using a fuzzy matching algorithm, wherein the replacing of the plurality of characters is performed in response to the comparing.

9. The information handling system of claim 8 wherein the actions further comprise:

selecting each word of text from a second OCR text corresponding to the selected form printed text and including the handwritten text;

identifying a corresponding word in the template text that corresponds to each of the selected words from the second OCR text;

comparing the selected word from the second OCR text with the corresponding word in the template text using the fuzzy matching algorithm, wherein the comparing results in a word comparison score;

writing the selected word from the second OCR text to the form with template inclusions in response to the word comparison score indicating that the selected word is absent from the template text; and writing the corresponding word from the template text to the form with template inclusions in response to the word comparison score indicating that the selected word is present in the template text.

10. The information handling system of claim 7 wherein the actions further comprise:

identifying a version of the selected form template from a plurality of versions of the selected form template, wherein the identifying further comprises:

performing a fuzzy comparison of the first OCR text with the text from the plurality of versions of the selected form template, wherein each of the comparisons results in a form version score; and selecting the selected form template from the plurality of versions of the selected form template based on the corresponding form version score.

11. The information handling system of claim 7 wherein the actions further comprise:

ingesting the form with template inclusions into a Question Answering (QA) System corpus.

12. The information handling system of claim 7 wherein the actions further comprise:

wherein the selected document is a facsimile of the selected form template that has been filled in by hand; and performing an OCR process on the selected document, wherein the OCR process results in the first OCR text.

13. A computer program product stored in a computer readable storage medium, comprising computer program code that, when executed by an information handling system, causes the information handling system to perform actions comprising:

receiving a selected form comprising printed text and handwritten text;

identifying a selected form template from a plurality of form templates, wherein each of the plurality of form templates comprises a plurality of lines of text, and wherein the identifying further comprises:

performing a fuzzy comparison of a first optical character recognition (OCR) text corresponding to the selected form printed text, and excluding the handwritten text, with text from the plurality of form templates, wherein each of the comparisons results in a form comparison score; and selecting the selected form template from the plurality of form templates based on the corresponding form comparison score;

in response to identifying the selected form template, comparing the first OCR text corresponding to the selected form with template text corresponding to the selected form template;

replacing a plurality of characters in the first OCR text with text from the template text, the replacing resulting in a form with template inclusions; and processing the form with template inclusions in a forms processing operation.

14. The computer program product of claim 13 wherein the actions that perform the comparing further comprise:

comparing each word of the template text with a corresponding word from the first OCR text using a fuzzy matching algorithm, wherein the replacing of the plurality of characters is performed in response to the comparing.

15. The computer program product of claim 14 wherein the actions further comprise:

selecting each word of text from a second OCR text corresponding to the selected form printed text and including the handwritten text;

identifying a corresponding word in the template text that corresponds to each of the selected words from the second OCR text;

comparing the selected word from the second OCR text with the corresponding word in the template text using the fuzzy matching algorithm, wherein the comparing results in a word comparison score;

writing the selected word from the second OCR text to the form with template inclusions in response to the word comparison score indicating that the selected word is absent from the template text; and writing the corresponding word from the template text to the form with template inclusions in response to the word comparison score indicating that the selected word is present in the template text.

16. The computer program product of claim 13 wherein the actions further comprise:

identifying a version of the selected form template from a plurality of versions of the selected form template, wherein the identifying further comprises:

performing a fuzzy comparison of the first OCR text with the text from the plurality of versions of the selected form template, wherein each of the comparisons results in a form version score; and selecting the selected form template from the plurality of versions of the selected form template based on the corresponding form version score.

17. The computer program product of claim 13 wherein the actions further comprise:

ingesting the form with template inclusions into a Question Answering (QA) System corpus.

* * * * *